United States Patent
Nakayama et al.

(10) Patent No.: US 10,673,054 B2
(45) Date of Patent: Jun. 2, 2020

(54) WIRING MODULE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Osamu Nakayama, Yokkaichi (JP); Seishi Kimura, Yokkaichi (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 230 days.

(21) Appl. No.: 16/065,480

(22) PCT Filed: Dec. 12, 2016

(86) PCT No.: PCT/JP2016/086846
§ 371 (c)(1),
(2) Date: Jun. 22, 2018

(87) PCT Pub. No.: WO2017/115639
PCT Pub. Date: Jul. 6, 2017

(65) Prior Publication Data
US 2018/0375082 A1 Dec. 27, 2018

(30) Foreign Application Priority Data
Dec. 28, 2015 (JP) ................................. 2015-256574

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 10/0413* (2013.01); *H01R 11/288* (2013.01); *H01M 2220/20* (2013.01)

(58) Field of Classification Search
None
See application file for complete search history.

(56) References Cited

U.S. PATENT DOCUMENTS

2011/0045329 A1  2/2011  Ikeda et al.
2014/0238723 A1  8/2014  Ogasawara et al.
(Continued)

FOREIGN PATENT DOCUMENTS

JP  2014232633 A  12/2014
JP  2015133223 A  7/2015

OTHER PUBLICATIONS

International Search Report and Written Opinion for Application No. PCT/JP2016/086846 dated Jan. 31, 2017; 5 pages.

*Primary Examiner* — Wyatt P McConnell
(74) *Attorney, Agent, or Firm* — Reising Ethington, P.C.

(57) ABSTRACT

A wiring module to be attached to an electricity storage element group in which a plurality of electricity storage elements having electrodes are lined up includes a plurality of busbars to be connected to the electrodes and a plurality of accommodating portions in which the busbars are respectively accommodated. Each of the accommodating portions has an accommodating wall that is disposed around the busbar, and the accommodating wall includes a first adjoining wall and a second adjoining wall opposing the first adjoining wall. The first adjoining wall of one accommodating portion and the second adjoining wall of another accommodating portion are arranged adjoining each other. The first adjoining wall has a first locking portion that locks the busbar and an auxiliary wall that protrudes toward the second adjoining wall and covers the first locking portion (Continued)

from the second adjoining wall side. The second adjoining wall has an opening in which the auxiliary wall is accommodated.

4 Claims, 8 Drawing Sheets

(51) Int. Cl.
*H01M 10/04* (2006.01)
*H01R 11/28* (2006.01)

(56) References Cited

U.S. PATENT DOCUMENTS

2014/0315441 A1* 10/2014 Kinoshita ........... H01M 2/1077
439/627
2015/0125727 A1 5/2015 Lui et al.

* cited by examiner

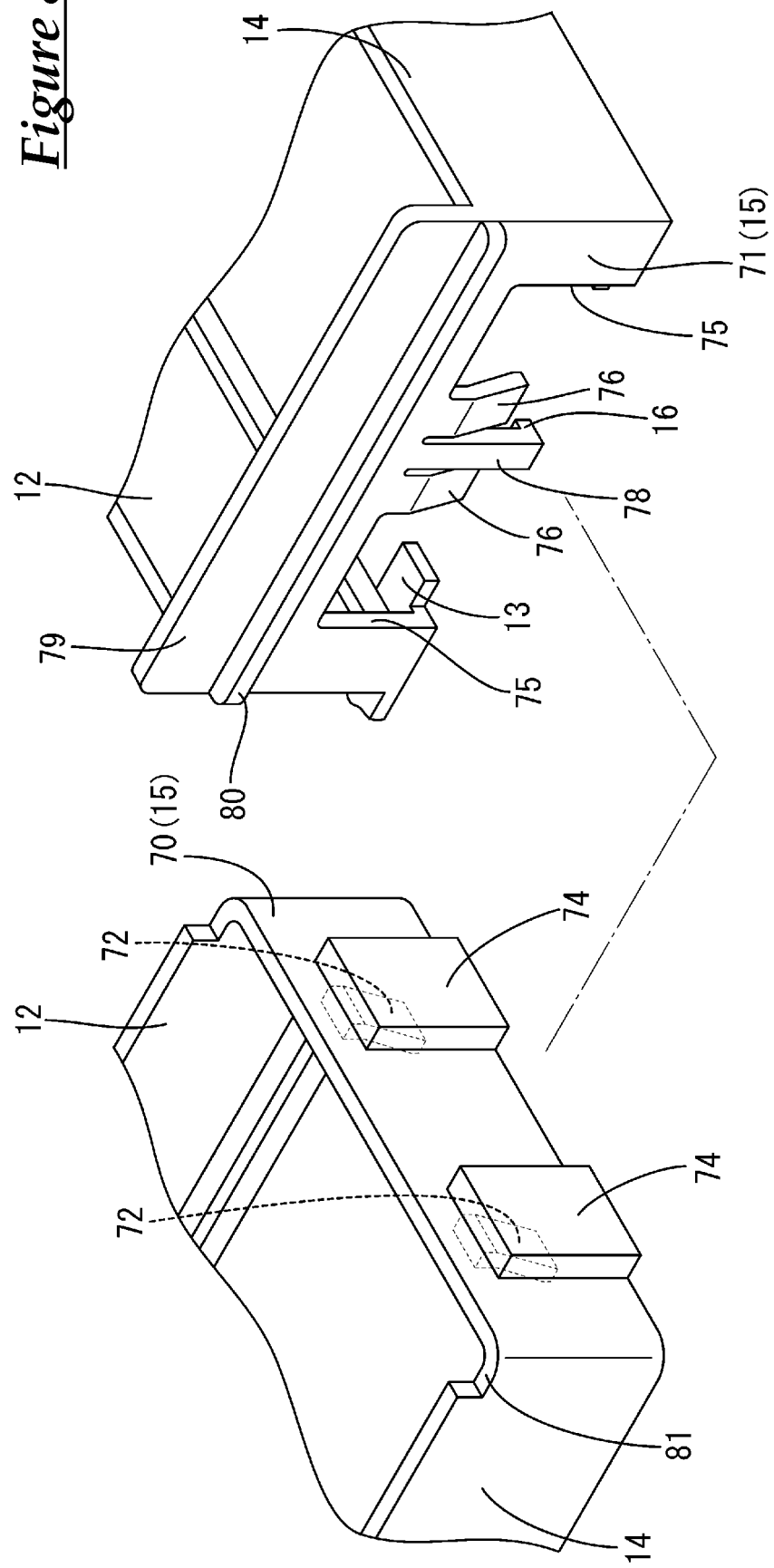

WIRING MODULE

CROSS REFERENCE TO RELATED APPLICATIONS

This application claims the priority of Japanese patent application JP2015-256574 filed on Dec. 28, 2015, the entire contents of which are incorporated herein.

TECHNICAL FIELD

The technology disclosed in the present specification relates to a wiring module.

BACKGROUND ART

A wiring module disclosed in JP 2013-4186A is conventionally known. This wiring module is configured to be attached to an electricity storage element group in which a plurality of electricity storage elements are lined up. The wiring module includes a busbar configured to be connected to electrode terminals of the electricity storage elements and a holding portion that holds the busbar.

The holding portion has a partition wall that separates the busbar from the outside. The partition wall is provided with an exposure portion where the busbar is exposed to the outside of the partition wall. The partition wall is further provided with an auxiliary wall that at least partially covers the exposure portion. The auxiliary wall insulates the busbar from the outside. Also, the auxiliary wall reinforces the partition wall.

SUMMARY

According to the above-described configuration, the auxiliary wall is provided in addition to the partition wall. Therefore, if a configuration is adopted in which partition walls provided with auxiliary walls are arranged adjoining each other, it is difficult to reduce the distance between the adjacent partition walls because of the auxiliary walls. Thus, there is a problem in that it is difficult to reduce the size of the wiring module.

The technology disclosed in the present specification has been accomplished based on the above-described circumstances, and it is an object thereof to reduce the size of the wiring module.

The technology disclosed in the present specification relates to a wiring module to be attached to an electricity storage element group in which a plurality of electricity storage elements having electrodes are lined up, the wiring module including a plurality of conductive members to be connected to the electrodes of the electricity storage elements; and a plurality of accommodating portions in which the plurality of conductive members are respectively accommodated, wherein each of the plurality of accommodating portions has an accommodating wall that is disposed around the conductive member, the accommodating wall including a first adjoining wall and a second adjoining wall opposing the first adjoining wall, the first adjoining wall of one accommodating portion of the plurality of accommodating portions and the second adjoining wall of another accommodating portion that is located next to the one accommodating portion are arranged adjoining each other, the first adjoining wall has a first locking portion that locks the conductive member and an auxiliary wall that protrudes toward the second adjoining wall and covers the first locking portion from the second adjoining wall side, and the second adjoining wall has an opening in which the auxiliary wall is accommodated.

With the above-described configuration, since the auxiliary wall is accommodated in the opening of the second adjoining wall, the distance between adjacent accommodating portions can be reduced compared with a case where the opening is not provided in the second adjoining wall. The size of the wiring module can thus be reduced.

The following embodiments are preferred as embodiments of the technology disclosed in the present specification.

It is preferable that a reinforcing rib is formed on the second adjoining wall, the reinforcing rib protruding from a wall surface of the second adjoining wall.

There is concern that the strength of the second adjoining wall may decrease due to the opening being provided in the second adjoining wall. To address this issue, in the above-described configuration, the reinforcing rib is formed on the second adjoining wall. The decrease in strength of the second adjoining wall can thus be suppressed.

It is preferable that the second adjoining wall has a second locking portion that locks the conductive member, and the first locking portion and the second locking portion are provided at positions shifted from each other in a thickness direction of the second adjoining wall.

With the above-described configuration, since the first locking portion and the second locking portion are provided at the respective positions that are shifted from each other in the thickness direction of the second adjoining wall, the distance between the first adjoining wall and the second adjoining wall can be reduced compared with a case where the first locking portion and the second locking portion are provided at positions that overlap each other in the thickness direction of the second adjoining wall. The size of the wiring module can thus be even further reduced.

It is preferable that a plurality of connectable units are coupled together, each connectable unit having at least one of the plurality of accommodating portions, and the connectable units that are coupled to each other are arranged such that the first adjoining wall and the second adjoining wall adjoin each other.

With the above-described configuration, since the auxiliary wall formed on the first adjoining wall is accommodated in the opening of the second adjoining wall, the distance between the connectable units can be reduced. The size of the wiring module can thus be reduced.

According to the technology disclosed in the present specification, the size of the wiring module can be reduced.

BRIEF DESCRIPTION OF DRAWINGS

FIG. 8 is a partially enlarged perspective view showing a structure for engaging the connectable units with each other.

DESCRIPTION OF EMBODIMENTS

Embodiment 1

Figure 1:
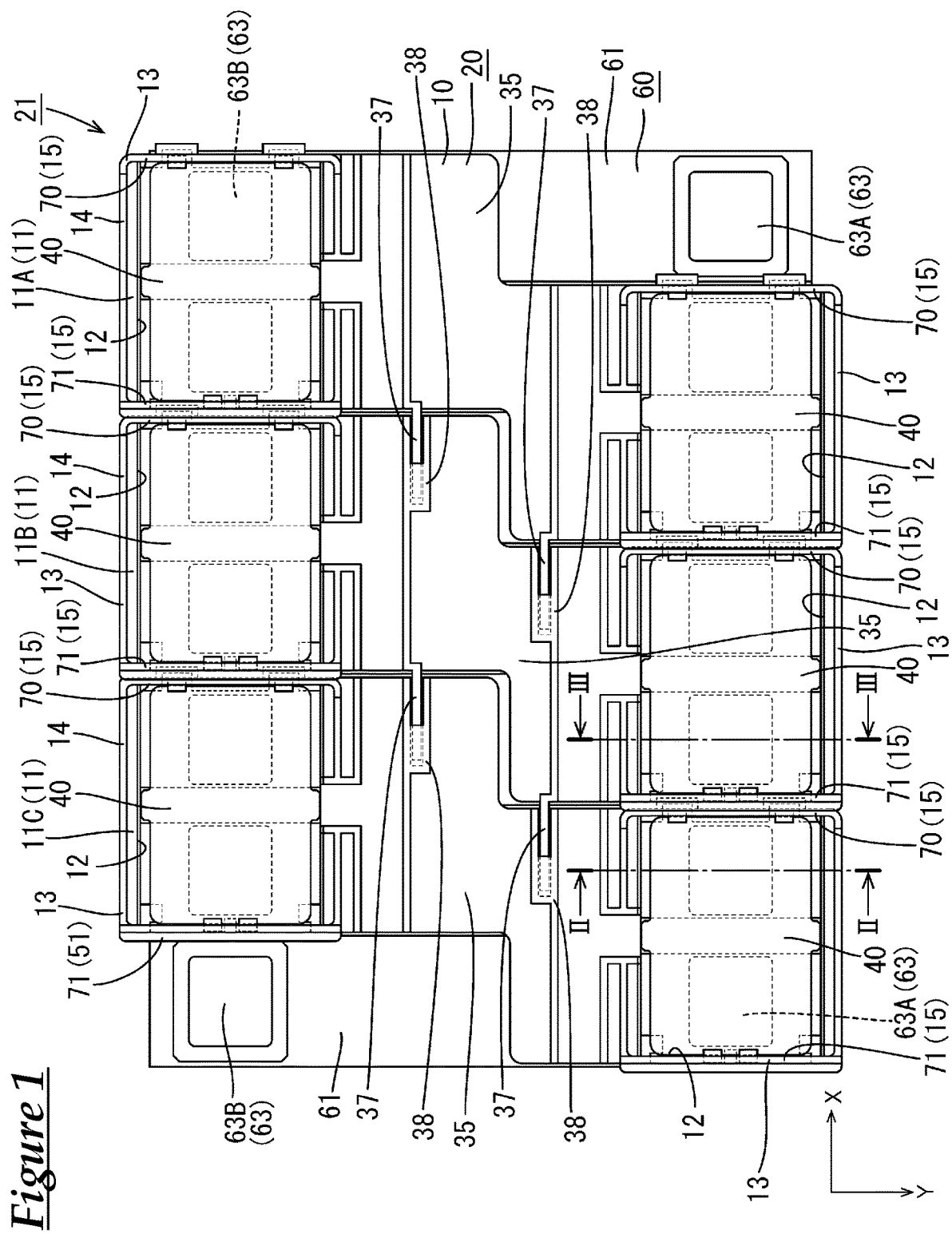
FIG. 1 is a plan view showing an electricity storage module according to Embodiment 1.

Embodiment 1 of the technology disclosed in the present specification will be described with reference to FIGS. 1 to 8. A wiring module 20 of the present embodiment is attached to an electricity storage element group 60 in which a plurality of electricity storage elements 61 are lined up, and constitutes an electricity storage module 21. The electricity storage module 21 is installed in a vehicle (not shown) such as an electric automobile or a hybrid automobile, and is used as a power source for driving the vehicle.

In the following description, a direction X is taken as the right side, a direction Y as the front side, and a direction Z as the upper side. Also, there are cases where one of a plurality of identical members is denoted by a reference numeral, while the reference numeral is omitted with respect to the other members.

Each electricity storage element 61 of the present embodiment is a secondary battery. As shown in FIG. 1, the plurality of electricity storage elements 61 are lined up in a single row and constitute the electricity storage element group 60.

As shown in FIG. 1, each electricity storage element 61 has a flat and rectangular parallelepiped-shaped external shape. A pair of electrodes 63 are arranged on an upper side of each electricity storage element 61 at respective positions near both end portions of that electricity storage element 61 in a longitudinal direction (front-rear direction) thereof. Each electrode 63 protrudes upward from the upper side of the electricity storage element 61 and has an angular tubular shape (see FIG. 2). One of the pair of electrodes 63 serves as a positive electrode 63A, and the other serves as a negative electrode 63B.

The plurality of electricity storage elements 61 are lined up such that, in adjacent two electricity storage elements 61, electrodes 63 with different polarities are adjacent to each other (i.e., the positive electrode 63A of one of the electricity storage elements 61 and the negative electrode 63B of the other electricity storage element 61 adjoining the former electricity storage element 61 are adjacent to each other).

The wiring module 20 is attached to an upper side of the electricity storage element group 60. More specifically, the wiring module 20 is attached to a surface of the electricity storage element group 60 that is constituted by the upper sides of the individual electricity storage elements 61. The wiring module 20 includes an insulating protector 10 and busbars 40 (an example of conductive members) that are held by the insulating protector 10 and that each connect a positive electrode 63A and a negative electrode 63B of adjacent electricity storage elements 61 to each other.

As shown in FIG. 1, each busbar 40 is made of a substantially rectangular metal plate material. The four corners of each busbar 40 are recessed inward. With regard to the metal from which the busbars 40 are made, any metal such as copper, a copper alloy, aluminum, or an aluminum alloy can be appropriately used as necessary. A plating layer may be formed on the surface of the busbars 40. With regard to the metal from which the plating layer is made, any metal such as tin or nickel can be appropriately selected as necessary.

The insulating protector 10 of the present embodiment is constituted by a plurality of connectable units 11 that are coupled together. In the present embodiment, three connectable units 11A, 11B, and 11C are lined up in the direction in which the plurality of electricity storage elements 61 are lined up. In the following description, the connectable unit 11 that is disposed at the right end in FIG. 1 is referred to as a first connectable unit 11A, the connectable unit 11 that is disposed next to the first connectable unit 11A (i.e., that is disposed at the center) is referred to as a second connectable unit 11B, and the connectable unit 11 that is disposed at the left end is referred to as a third connectable unit 11C. Moreover, the first connectable unit 11A, the second connectable unit 11B, or the third connectable unit 11C, when not differentiated from one another, may be referred to as the "connectable unit 11".

Each connectable unit 11 has two accommodating portions 12 that open in an up-down direction and that accommodate respective busbars 40.

The accommodating portions 12 each have an angular tubular accommodating wall 13. The busbars 40 are held inside the respective accommodating walls 13. Due to the accommodating walls 13, the busbars 40 that are held in adjacent accommodating portions 12 are kept insulated from each other.

Each accommodating wall 13 is constituted by a pair of long walls 14 and a pair of short walls 15 that connect the pair of long walls 14 to each other and that are shorter than the long walls 14. The lengths of the pair of long walls 14 and the pair of short walls 15 are set to such lengths that enable a pair of electrodes 63 that are adjacent to each other to be accommodated inside the accommodating wall 13.

Figure 4:
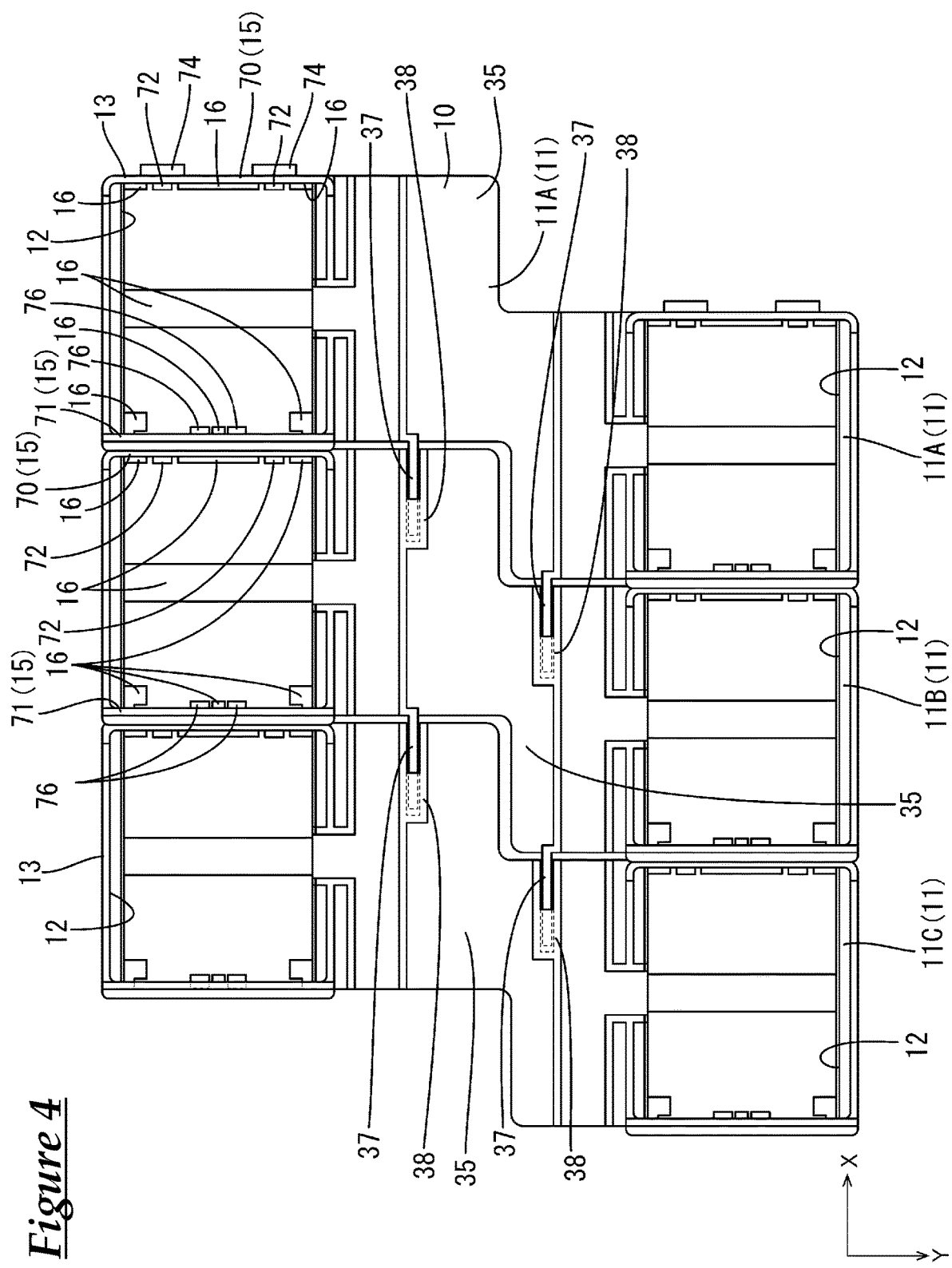
FIG. 4 is a plan view showing an insulating protector.

As shown in FIG. 4, the two accommodating walls 13 provided in a single connectable unit 11 are arranged such that the long walls 14 of one of the accommodating walls 13 are parallel to and oppose the long walls 14 of the other of the accommodating walls 13 and such that the two accommodating walls 13 are shifted with respect to each other in an extending direction (left-right direction) of the long walls 14 by a distance corresponding to a single electrode 63.

The short wall 15, of the pair of short walls 15, that is located on the right side of each accommodating portion 12 is referred to as a first adjoining wall 70. Also, the short wall 15, of the pair of short walls 15, that is located on the left side of the accommodating portion 12 is referred to as a second adjoining wall 71.

The plurality of accommodating portions 12 are arranged adjoining one another in the left-right direction. The arrangement is such that the first adjoining wall 70 of one accommodating portion 12 is located adjoining the second adjoining wall 71 of another accommodating portion 12 that is located next to and on the right side of the one accommodating portion, the second adjoining wall 71 being located next to and on the right side of the first adjoining wall 70.

As shown in FIG. 4, each accommodating portion 12 is provided with a plurality of placing portions 16 on which a busbar 40 is placed. More specifically, the placing portions 16 are provided in an upper-left corner portion, a lower-left corner portion, an upper-right corner portion, and a lower-right corner portion of the accommodating portion 12, as well as in the vicinity of the central position of the second adjoining wall 71 in the front-rear direction, in the vicinity of the central position of the first adjoining wall 70 in the front-rear direction, and a position extending between portions in the vicinity of the respective central positions of the pair of long walls 14 in the left-right direction. The busbar 40 is placed on these placing portions 16.

Figure 2:
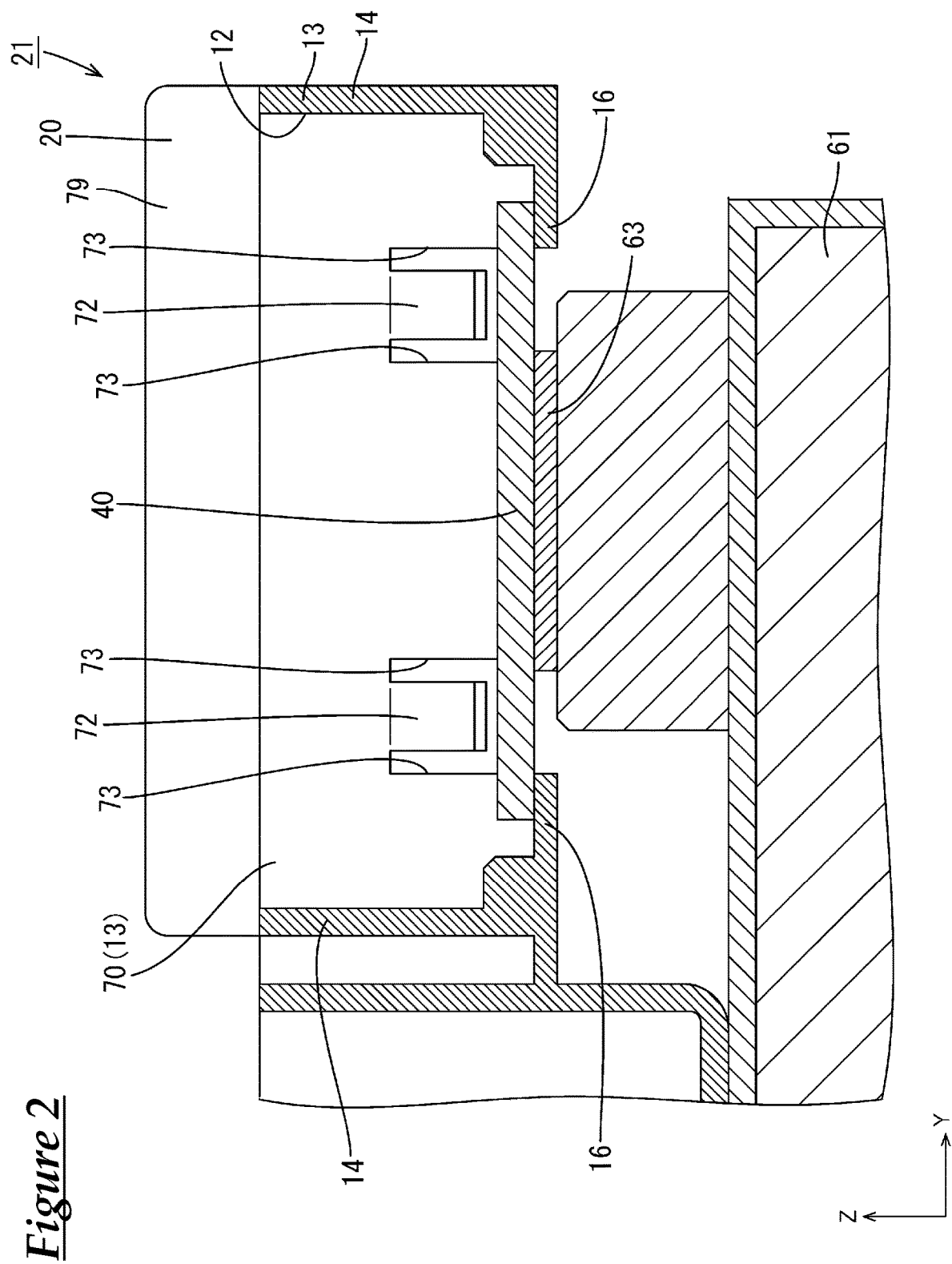
FIG. 2 is a cross-sectional view taken along line II-II in FIG. 1.

As shown in FIG. 2, each first adjoining wall 70 is provided with two first locking portions 72 at positions that are near a front end portion and a rear end portion, respectively, of the first adjoining wall 70 and that are located between the three placing portions 16. The first locking portions 72 are configured to prevent disengagement of the busbar 40 accommodated in the accommodating portion 12 from above. The first locking portions 72 are elastically deformable in a thickness direction (left-right direction) of the first adjoining wall 70. Each of the first locking portions 72 is in the form of a leaf spring extending obliquely downward from the first adjoining wall 70 toward the inside of the accommodating wall 13.

First slits 73 are formed in the first adjoining wall 70, the first slits 73 extending in the up-down direction on the front side and the rear side, respectively, of each of the first locking portions 72. The first slits 73 make the first locking portions 72 elastically deformable.

Two auxiliary walls 74 that cover the two respective first locking portions 72 from the second adjoining wall 71 side are formed on the first adjoining wall 70. The auxiliary walls 74 protrude from an outer surface of the first adjoining wall 70 toward the second adjoining wall 71. The auxiliary walls 74 cover the first locking portions 72 and the first slits 73 from the second adjoining wall 71 side. Each of the auxiliary walls 74 is formed in a substantially rectangular shape when viewed from the second adjoining wall 71 side.

Figure 3:
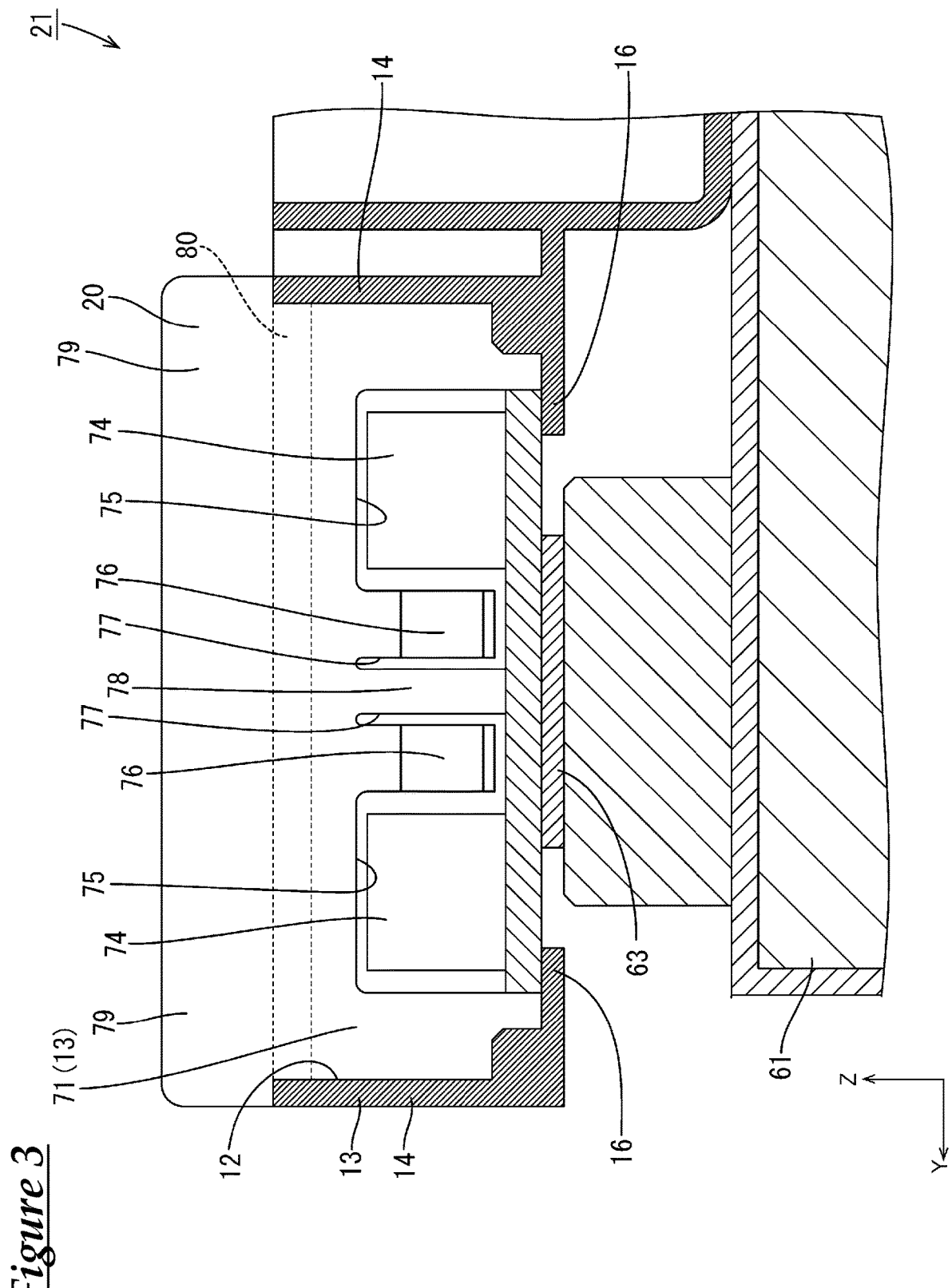
FIG. 3 is a cross-sectional view taken along line in FIG. 1.

As shown in FIG. 3, two openings 75 are provided in each second adjoining wall 71, the openings 75 being located at respective positions corresponding to the two auxiliary walls 74 of the first adjoining wall 70. An opening edge portion of each opening 75 is formed in a substantially rectangular shape that opens downward, when viewed from the first adjoining wall 70 side.

Two second locking portions 76 are formed in the second adjoining wall 71, the second locking portions 76 being located at respective positions between the two openings 75 and in the vicinity of the central position of the second adjoining wall 71 in the front-rear direction. The two second locking portions 76 are formed at such positions that sandwich, in the front-rear direction, the placing portion 16 that is formed in the vicinity of the central position of the second adjoining wall 71 in the front-rear direction.

The second locking portions 76 are elastically deformable in the thickness direction (left-right direction) of the second adjoining wall 71. Each of the second locking portions 76 is in the form of a leaf spring extending obliquely downward from the second adjoining wall 71 toward the inside of the accommodating wall 13.

The two second locking portions 76 are arranged side-by-side in the front-rear direction. The above-described openings 75 are formed at the positions on the outer side of the two respective second locking portions 76 with respect to the front-rear direction. Second slits 77 are formed at positions on the inner side of the two respective second locking portions 76 with respect to the front-rear direction. The openings 75 and the second slits 77 together make the second locking portions 76 elastically deformable.

As shown in FIG. 8, a column portion 78 extending downward is formed in the vicinity of a substantially central position of the second adjoining wall 71 in the front-rear direction. The above-described second slits 77 are formed between the column portion 78 and corresponding ones of the two second locking portions 76. A lower end portion of the column portion 78 protrudes toward the inside of the accommodating portion 12 and serves as the above-described placing portion 16.

Figure 5:
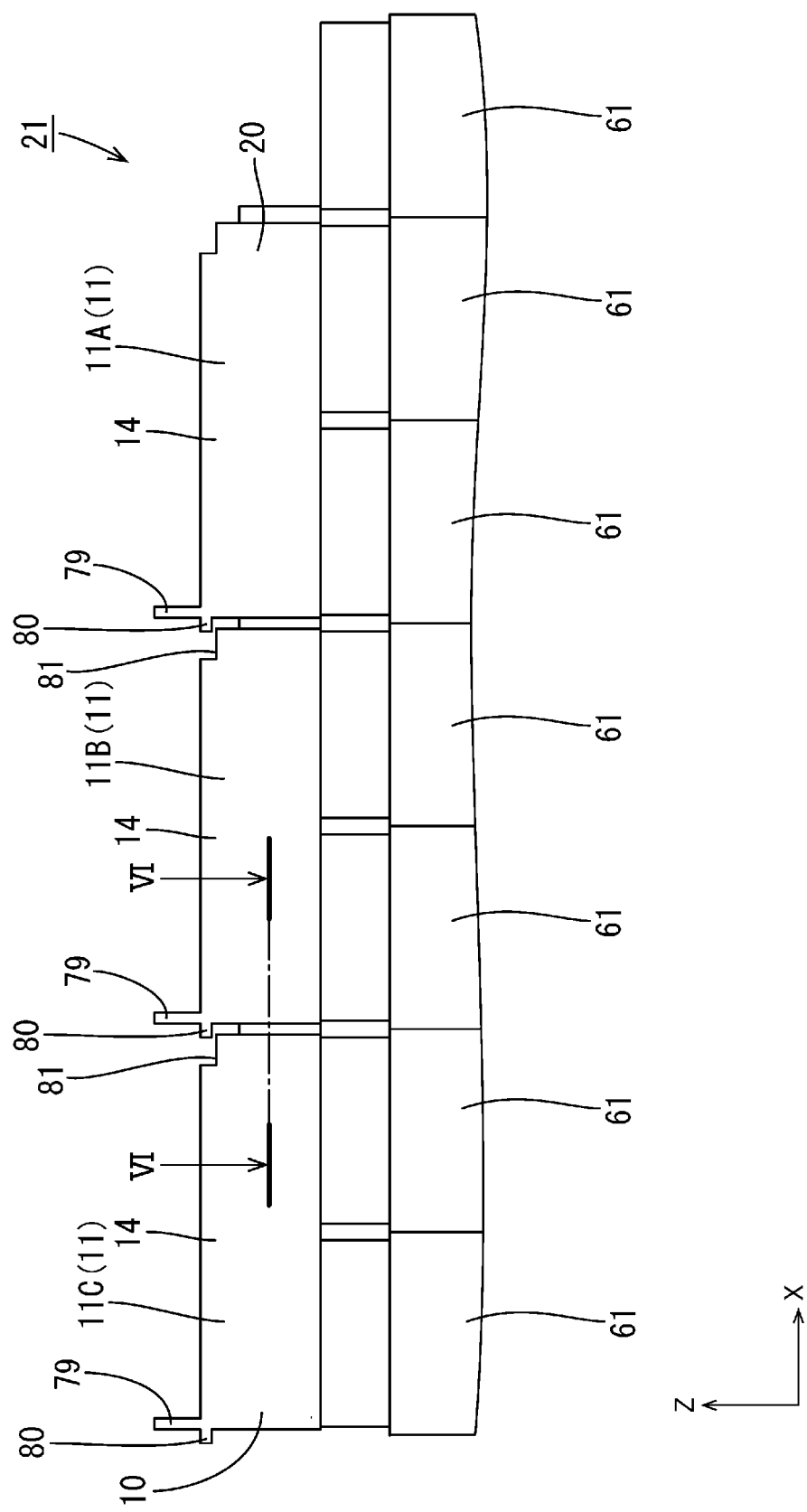
FIG. 5 is a partially enlarged side view showing the electricity storage module.

As shown in FIG. 5, a first reinforcing rib 79 (an example of a reinforcing rib) is formed at an upper end portion of each second adjoining wall 71 and extends upward. Moreover, a second reinforcing rib 80 (an example of the reinforcing rib) is formed on the second adjoining wall 71, the second reinforcing rib 80 extending from a position in the vicinity of the central position of the second adjoining wall 71 with respect to the up-down direction and above the second locking portions 76 and the column portion 78 toward the first adjoining wall 70. The second reinforcing rib 80 is formed running over the entire width of the second adjoining wall 71 in the front-rear direction. A clearance recess 81 that prevents interference with the second reinforcing rib 80 is formed in each first adjoining wall 70.

As shown in FIG. 1, the two accommodating portions 12 provided in each connectable unit 11 are coupled to each other by a coupling portion 35. The coupling portion 35 has a plate-like shape. The coupling portion 35 has a crank-like overall shape in plan view.

The coupling portion 35 is provided with unit engagement portions 37 and/or unit engagement receiving portions 38 for coupling to an adjacent connectable unit 11.

Here, the connectable units 11 will be described differentiated from one another. The first connectable unit 11A is provided with a pair of plate-shaped unit engagement portions 37 extending from a side edge, of a pair of side edges of the coupling portion 35, that is located on the second connectable unit 11B side toward the second connectable unit 11B. Although not shown in detail, each of the unit engagement portions 37 has an engagement claw at a leading end portion thereof.

The coupling portion 35 of the second connectable unit 11B has large-plate-thickness portions at respective positions corresponding to the unit engagement portions 37 of the first connectable unit 11A, and the recessed, unit engagement receiving portions 38 in which the unit engagement portions 37 of the first connectable unit 11A can be received are provided in the large-plate-thickness portions. Although not shown in detail, each of the unit engagement receiving portions 38 includes a protruding piece that is engageable with a corresponding one of the engagement claws of an adjacent connectable unit 11.

Moreover, a side edge, of a pair of side edges of the coupling portion 35 of the second connectable unit 11B, that is located on the third connectable unit 11C side is provided with a pair of unit engagement portions 37 that are the same as the unit engagement portions 37 of the first connectable unit 11A.

Furthermore, a side edge, of a pair of side edges of the coupling portion 35 of the third connectable unit 11C, that is located on the second connectable unit 11B side is provided with a pair of unit engagement receiving portions 38 that are the same as the unit engagement receiving portions 38 of the second connectable unit 11B, at respective positions corresponding to the unit engagement portions 37 of the second connectable unit 11B.

As a result of the unit engagement portions 37 and the respective unit engagement receiving portions 38 of these connectable units 11 engaging with each other, adjacent ones of the connectable units 11 are coupled to each other, thereby configuring the insulating protector 10.

Effects of the Embodiment

Next, the effects of the embodiment will be described. According to the present embodiment, the wiring module 20 that is attached to the electricity storage element group 60, in which the plurality of electricity storage elements 61 having the electrodes 63 are lined up, includes the plurality of busbars 40, which are connected to the electrodes 63 of the electricity storage elements 61, and the plurality of accommodating portions 12, in which the plurality of busbars 40 are respectively accommodated. Each of the plurality of accommodating portions 12 has the accommodating wall 13, which is disposed around the busbar 40, and the accommodating wall 13 includes the first adjoining wall 70 and the second adjoining wall 71 opposing the first adjoining wall 70. The first adjoining wall 70 of one accommodating portion 12 of the plurality of accommodating portions 12 and the second adjoining wall 71 of another accommodating portion 12 that is located next to the one accommodating portion 12 are arranged adjoining each other. The first adjoining wall 70 has the first locking portions 72, which lock the busbar 40, and the auxiliary walls 74, which protrude toward the second adjoining wall 71 and cover the respective first locking portions 72 from the second adjoining wall 71 side. The second adjoining wall 71 has the openings 75, in which the respective auxiliary walls 74 are accommodated.

Figure 6:
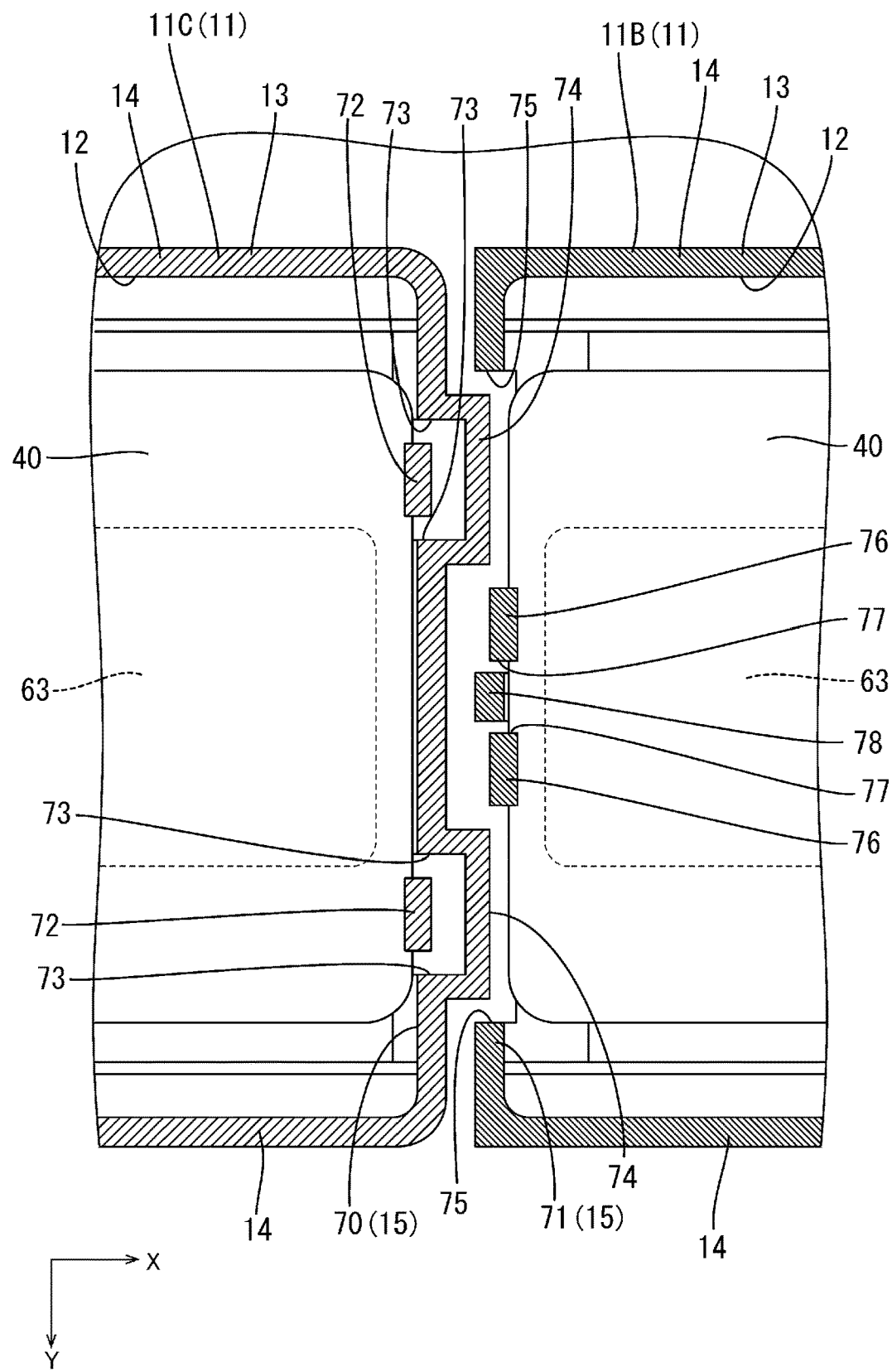
FIG. 6 is a cross-sectional view taken along line VI-VI in FIG. 5.
Figure 7:
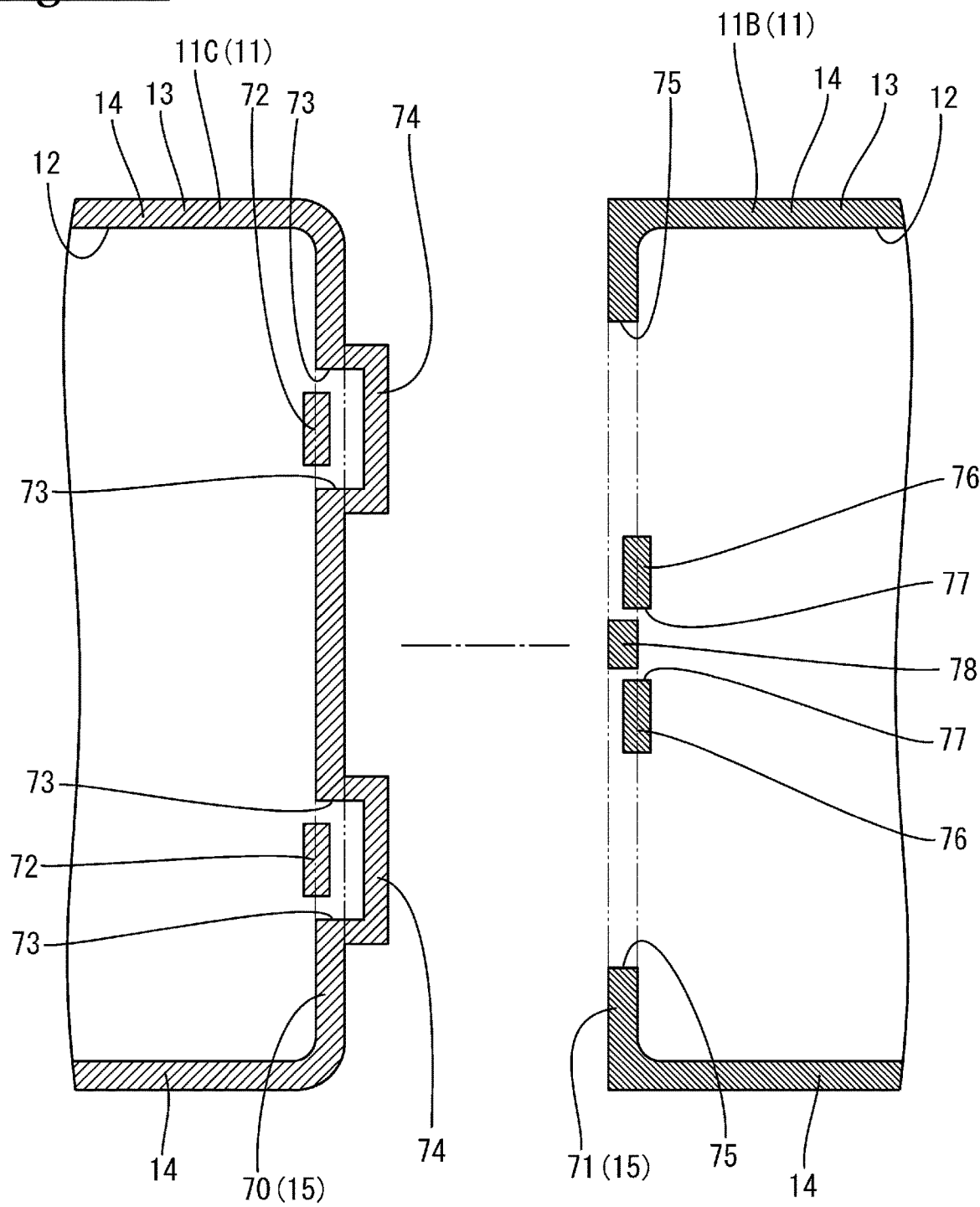
FIG. 7 is a partially enlarged cross-sectional view showing a state before connectable units are coupled to each other.

As shown in FIGS. 6 and 7, with the above-described configuration, since the auxiliary walls 74 are accommodated in the respective openings 75 of the second adjoining wall 71, the distance between adjacent accommodating portions 12 can be reduced compared with a case where the openings 75 are not provided in the second adjoining wall 71. The size of the wiring module 20 can thus be reduced.

Moreover, according to the present embodiment, the first reinforcing rib 79 and the second reinforcing rib 80, which protrude from the wall surfaces of the second adjoining wall 71, are formed on the second adjoining wall 71.

There is concern that the strength of the second adjoining wall 71 may decrease due to the openings 75 being provided therein. To address this issue, in the above-described configuration, the first reinforcing rib 79 and the second reinforcing rib 80 are formed on the second adjoining wall 71. The decrease in strength of the second adjoining wall 71 can thus be suppressed.

Moreover, according to the present embodiment, the second adjoining wall 71 has the second locking portions 76, which lock the busbar 40, and each first locking portion 72 and a corresponding one of the second locking portions 76 are provided in positions that are shifted from each other in the thickness direction of the second adjoining wall 71.

With the above-described configuration, in which each of the first locking portions 72 and a corresponding one of the second locking portions 76 are provided in positions that are shifted from each other in the thickness direction of the second adjoining wall 71, the distance between the first adjoining wall 70 and the second adjoining wall 71 can be reduced compared with a case where each of the first locking portions 72 and a corresponding one of the second locking portions 76 are provided in positions that overlap each other in the thickness direction of the second adjoining wall 71. The size of the wiring module 20 can thus be even further reduced.

Moreover, according to the present embodiment, the plurality of connectable units 11 each having at least one of the plurality of accommodating portions 12 are coupled together, and the connectable units 11, of these connectable units 11, that are coupled to each other are arranged such that the first adjoining wall 70 and the second adjoining wall 71 adjoin each other.

With the above-described configuration, since the auxiliary walls 74 formed on the first adjoining wall 70 are accommodated in the openings 75 of the second adjoining wall 71, the distance between the connectable units 11 can be reduced. The size of the wiring module 20 can thus be reduced.

Other Embodiments

The technology disclosed in the present specification is not limited to the embodiment that has been described so far with reference to the drawings. For example, the following embodiments are also embraced within the technical scope of the technology disclosed in the present specification.

In the foregoing embodiment, the configuration in which an insulating protector 10 is formed by coupling a plurality of connectable units 11 together is adopted. However, the present invention is not limited to this configuration, and a configuration in which a plurality of accommodating portions 12 are formed in a single insulating protector 10 may also be adopted.

In the present embodiment, the configuration in which two accommodating portions 12 are formed in a single connectable unit 11 is adopted. However, the present invention is not limited to this configuration, and a configuration in which one accommodating portion 12 is formed in a single connectable unit 11 may also be adopted, or a configuration in which three or more accommodating portions 12 are formed in a single connectable unit 11 may also be adopted.

The first locking portions 72 and the second locking portions 76 may also be arranged overlapping in the thickness direction of the first adjoining wall 70 or the second adjoining wall 71.

Both or either one of the first reinforcing rib 79 and the second reinforcing rib 80 may be omitted.

In the present embodiment, the conductive members are the busbars 40, which each electrically connect the positive electrode 63A and the negative electrode 63B to each other. However, the present invention is not limited to this, and the conductive members may also be voltage detection terminals that are each connected to a positive electrode 63A or a negative electrode 63B and that detect the voltage of the electricity storage elements 61.

The electricity storage elements may also be capacitors.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

11 Connectable units
12 Accommodating portion
13 Accommodating wall
20 Wiring module
40 Busbar (Conductive member)
60 Electricity storage element group
61 Electricity storage element
63 Electrode
63A Positive electrode
63B Negative electrode
70 First adjoining wall
71 Second adjoining wall
72 First locking portion
74 Auxiliary wall
75 Opening
76 Second locking portion
79 First reinforcing rib (Reinforcing rib)
80 Second reinforcing rib (Reinforcing rib)

The invention claimed is:

1. A wiring module to be attached to an electricity storage element group in which a plurality of electricity storage elements having electrodes are lined up, the wiring module comprising:
   a plurality of conductive members to be connected to the electrodes of the electricity storage elements; and
   a plurality of accommodating portions in which the plurality of conductive members are respectively accommodated,
   wherein each of the plurality of accommodating portions has an accommodating wall that is disposed around the conductive member, the accommodating wall including a first adjoining wall and a second adjoining wall opposing the first adjoining wall,
   the first adjoining wall of one accommodating portion of the plurality of accommodating portions and the second adjoining wall of another accommodating portion that is located next to the one accommodating portion are arranged adjoining each other,
   the first adjoining wall has a first locking portion that locks the conductive member and an auxiliary wall that protrudes toward the second adjoining wall and covers the first locking portion from the second adjoining wall side, and
   the second adjoining wall has an opening in which the auxiliary wall is accommodated.

2. The wiring module according to claim 1,
   wherein a reinforcing rib is formed on the second adjoining wall, the reinforcing rib protruding from a wall surface of the second adjoining wall.

3. The wiring module according to claim 1,
   wherein the second adjoining wall has a second locking portion that locks the conductive member, and
   the first locking portion and the second locking portion are provided at positions shifted from each other in a thickness direction of the second adjoining wall.

4. The wiring module according to claim 1,
   wherein a plurality of connectable units are coupled together, each connectable unit having at least one of the plurality of accommodating portions, and
   the connectable units that are coupled to each other are arranged such that the first adjoining wall and the second adjoining wall of the respective connectable units adjoin each other.

* * * * *